(12) United States Patent
Tiemeyer

(10) Patent No.: US 7,157,000 B2
(45) Date of Patent: Jan. 2, 2007

(54) CATALYTIC BIOCONVERSION OF PETROLEUM-CONTAMINATED WASTES/WASTEWATERS USING KENAF CORE POWDER

(75) Inventor: Eric B. Tiemeyer, Schertz, TX (US)

(73) Assignee: Energy & Environmental Holdings, LLC, Lancaster, CA (US)

( * ) Notice: Subject to any disclaimer, the term of this patent is extended or adjusted under 35 U.S.C. 154(b) by 0 days.

(21) Appl. No.: 11/124,568

(22) Filed: May 9, 2005

(65) Prior Publication Data
US 2006/0249451 A1 Nov. 9, 2006

(51) Int. Cl.
*C02F 3/00* (2006.01)

(52) U.S. Cl. ............ 210/609; 210/615; 210/616; 210/617; 210/618

(58) Field of Classification Search ......... 210/609, 210/615, 616, 617, 618
See application file for complete search history.

(56) References Cited

U.S. PATENT DOCUMENTS 5,366,520 A * 11/1994 Tiemeyer .............. 44/629
6,436,288 B1 * 8/2002 Burcham et al. ........... 210/602
6,599,423 B1 * 7/2003 Boles et al. .............. 210/606

* cited by examiner

Primary Examiner—Chester T. Barry
(74) Attorney, Agent, or Firm—John E. Vandigriff

(57) ABSTRACT

A Catalytic Bioconversion (CB) process using kenaf core powder is used to promote an environmentally friendly method to biologically treat the petroleum contaminants in these wastes and waste waters while simultaneously producing a high energy solid fuel. The new process has very low capital and operating costs, treats and converts hazardous waste to non-hazardous waste, and can produce a viable solid fuel product instead of a waste. Typically, these petroleum-contaminated waste/wastewaters undergo some type of hydrocarbon separation and recovery via phase separation using heat and chemical treatment in storage tanks. The objective is to recover as much "good" hydrocarbon as possible and recycle it back to the production process. The material that is not recoverable, an emulsion of oil, water, and solids must be further processed and eventually discarded.

15 Claims, 1 Drawing Sheet

CATALYTIC BIOCONVERSION OF PETROLEUM-CONTAMINATED WASTES/WASTEWATERS USING KENAF CORE POWDER

FIELD OF THE INVENTION

This invention relates to processing of petroleum-contaminated waste/wastewaters generated by the petroleum refining and/or petrochemical industry, and more particularly to a Catalytic Bioconversion (CB) process using kenaf core powder to promote an environmentally friendly method to biologically treat the petroleum contaminants in these wastes while simultaneously producing a high energy solid fuel for use in industrial cement plants and/or power plants.

BACKGROUND OF THE INVENTION

Certain hazardous wastes and wastewater generated by the petroleum industry (K048, K049, K051, F037 and F038) are emulsified mixtures of solids, water, and oil that are extremely difficult to treat, transport, and dispose of. These wastes, in their original state, cannot be directly used as a fuel without considerable dewatering, nor can they be feasibly transported in conventional liquids tankers due to their high solids content. Costs associated with dewatering, transporting, and disposing of these wastes are very burdensome to the petroleum refining and petrochemical industry. Currently, refineries and petrochemical plants are using filter presses, high speed centrifuges, and thermal desorption to process these wastes and waste waters. These currently used processes involve substantial capital investments along with exorbitant operating costs. More importantly, they generate a waste material that is classified as a hazardous waste and must be incinerated and/or land-filled with a significant cost and continued liability. Fiscal costs and future liabilities associated with dewatering, transporting, and disposing of these wastes are very burdensome to the petroleum and petrochemical industries.

The below discussed prior patents define preparation of fibers for use in waste treatment and generally discuss the disadvantages of using absorbent materials in the treatment of waste material due to the dewatering required.

A method of separating kenaf into core and fiber has been described in U.S. Pat. No. 5,970,582. Disclosed is a method and apparatus for separating kenaf into fiber and core uses a modified stick machine conventionally used in the cotton industry for removing trash from unginned cotton. Lengths of kenaf are delivered onto the periphery of a saw cylinder so the toothed wheels snag the fiber and draw the kenaf across a grate. Core is detached from the fiber, passes through the grate and is delivered to a core outlet. Fiber on the toothed wheels are removed by a doffing wheel and delivered to a fiber outlet. Multiple saw cylinder/doffing wheel assemblies are provided.

A typical waste water sludge stabilization process is taught in U.S. Pat. Nos. 4,781,842 and 4,902,431 wherein a sewage sludge is stabilized and converted to fertilizer by mixing the sludge with an alkaline material which is sufficient to raise the pH to at least 12. The mixture is then allowed to dry for at least one day. The alkaline material is selected from cement, kiln dust, and lime dust, to achieve chemical stabilization. Bulking materials, such as slag fines, fly ash, gypsum, etc. may also be added. Such a process is primarily a drying process to eliminate offensive odors and pathogenic microorganisms. The process is not capable of generating a substantial amount of heat to destroy many of the contaminants found therein.

U.S. Pat. No. 6,027,652 describes one process for alleviating the environmental problems associated with the production of oil or chemical sorbent materials is to use a sorbent system based on natural fibers. Over the last several decades, a wide variety of treated natural fibers have been used as sorbents of hazardous materials. These have included tree bark, peat, wood fiber, dealginate kelp, powdered lily, kenaf cores, puffed cereals, and a variety of other cellulosic materials. Each of these fiber types has disadvantages which have prevented them from becoming the material of choice for remediation of oil and chemical spills on land or in water. This patent states that the primary disadvantage of most of these fiber types is that they are naturally hydrophilic and, therefore, tend to sorb large quantities of water. Sorption of water increases the weight of these materials and can seriously decrease their ability to sorb the oil or hazardous chemical which these materials are intended to recover. It is possible to reduce or eliminate the tendency of some of these materials to sorb water by treatment with chemical additives to increase their hydrophobicity.

In U.S. Pat. No. 5,021,390, Hatton teaches a composition for sorbing liquids consisting of various fibrous plant materials treated with the waterproofing agent sodium methyl silicate. In U.S. Pat. No. 5,492,881, Diamond teaches a sorbent system using finely ground cellulose treated with a hydrophobic agent such as paraffin, other waxes, polyvinyl alcohol, hydroxyethyl cellulose or the like. These additives add to the manufacturing expense of the sorbent and may themselves be the source of further harm to the environment.

Another disadvantage, as disclosed in the prior art, of previously disclosed natural fiber based sorbents is that most are generally only capable of sorbing 5–10 times their mass in oil or other chemicals. Additionally, most of these natural fiber compositions have a tendency to sink as they become saturated with oil, water or other chemicals, making recovery of these materials and sorbed chemical from a body of water extremely difficult or impossible.

SUMMARY OF THE INVENTION

The invention is a Catalytic Bioconversion (CB) process using kenaf core powder to promote an environmentally friendly method to biologically treat the petroleum contaminants in these wastes and waste waters while simultaneously producing a high energy solid fuel. The new process has very low capital and operating costs, treats and converts hazardous waste to non-hazardous waste, and can produce a viable solid fuel product instead of a waste. Typically, these petroleum-contaminated waste/wastewaters undergo some type of hydrocarbon separation and recovery via phase separation using heat and chemical treatment in storage tanks. The objective is to recover as much "good" hydrocarbon as possible and recycle it back to the production process. The material that is not recoverable, an emulsion of oil, water, and solids must be further processed and eventually discarded.

In the invention, kenaf core powder is introduced into the waste/wastewater stream (after primary hydrocarbon recovery has been attempted) with a very simple in-line eductor injection system at a rate that can range from 100 to 5,000 mg/L. The kenaf core powder, because of its highly absorptive characteristics, immediately "grabs" a portion of the organic load in the petroleum-contaminated waste/wastewater stream. The waste/wastewater and kenaf mixture are then directed to a biological treatment system that includes a bioreactor for organic treatment and a centrifuge for separation of the solids. The kenaf core powder particles naturally contain approximately 45% glucose and 2% protein, a valuable source of energy for the microbes in the biological treatment system. As a result, the kenaf core powder particles are creating a site for the microbes that provides a rich food consisting of the organic load that has been absorbed and the naturally occurring glucose and protein. Furthermore, the kenaf core powder naturally contains and provides important nutrients (phosphorus, nitrogen, sulfur, calcium, potassium, and others) and a significant number of indigenous microorganisms to the biological system.

The net effect on the biological system is a much healthier and more viable microorganism population in the biological treatment system. Consequently, the system is less vulnerable to shock loads (swings in organic, toxic, and pH loading) and will recover from such events much faster. During normal loading, treatment efficiencies for pollutant removal will improve and thereby create an opportunity to increase loading to the biological system (provided the system can handle the additional hydraulic load). Most importantly, expensive chemicals (pH adjustment and/or nutrients) that are currently added to the biological system may be reduced or eliminated.

When the microbes assimilate the natural carbohydrate in kenaf, a protective outer shell consisting of glycocalx is produced by the individual bacterial cell. This protective shell is a key factor in providing the biological population with the ability to survive in the toxic environment that is inherent to treatment of these wastes/wastewaters. Organic and inorganic removal efficiencies obtained through the CB treatment process produce solids that are no longer classified as hazardous.

The benefits to the treatment system are not limited to the biological treatment system (bioreactors). In addition, a portion of the carbohydrates in the kenaf core powder consists of hemi-cellulose. Some of the hemi-cellulose is not consumed by the microbes in the biological system and becomes an important substrate in the solids that are discharged from the system. These solids will dewater better and dry faster than solids that do not contain the hemi-cellulose, and they can be dried and pelletized more economically. The enhanced dewatering properties of the waste activated sludge may reduce or eliminate chemical treatment of the solids. Also, because the solids contain the hemi-cellulose, they now have a much greater heat energy content. The dried, pelletized sludge can be used as a biomass fuel in cement kilns or power plants.

DESCRIPTION OF A PREFERRED EMBODIMENT

Figure 1:
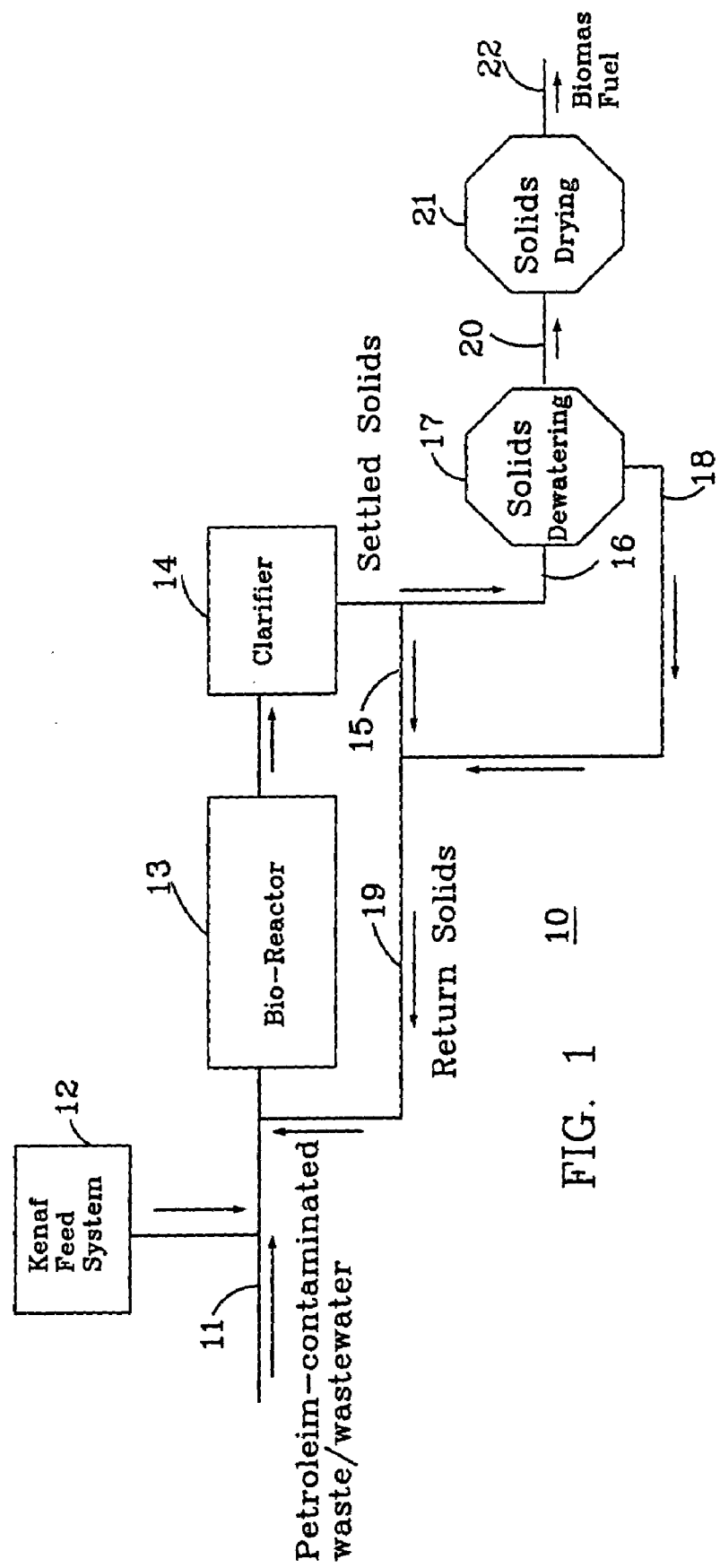
FIG. 1 shows a process flow diagram illustrating the invention.

FIG. 1 is a flow diagram of the process where kenaf powder 12 is introduced into the influent waste/wastewater stream 11 with an in-line injection system at a rate of 100 to 5,000 mg/liter. The flow rate of the untreated waste/wastewater stream is generally in the range of 5 to 500 gallons per minute. The kenaf powder that is combined with the waste/wastewater stream, and because of its highly absorptive characteristics, will immediately "grab" a portion of the organic load. The waste/wastewater stream and kenaf combine and flow into a bio-reactor where microbes and other elements break down the organics. The treated liquid is sent to a clarifier 14 where solids are separated from the liquid. Solids 16 are pumped to a bio-solid dewatering station while a part (19) of the solids (10% to 50%) may be returned to the bio-reactor 13 for further processing. The solids in the bio-solid dewatering station 17 are de-watered, with the water being returned 18 to the bio-reactor, and the dewatered solids 20 go through a solids drying process 21. The dried solid is then processed and stored 22 for use as a fuel.

The kenaf powder particles used in the process naturally contain approximately 45% glucose and 2% protein, a valuable source of energy for the microbes in the biological system. As a result, the kenaf powder particles are creating a site for the microbes that provides a rich food consisting of the organic load that has been absorbed and the naturally occurring glucose and protein. Furthermore, the kenaf powder naturally contains, and provides to the biological system, important nutrients (phosphorus, nitrogen, sulfur, calcium, potassium, and others) along with a significant number of indigenous microorganisms. The net effect on the biological system is a much healthier and more viable microorganism population in the biological system. Consequently, the system is less vulnerable to shock loads (swings in organic, toxic, or pH loading) and will recover from such events much faster. During normal loading, treatment efficiencies for pollutant removal will improve and thereby create an opportunity to increase loading to the system. Most importantly, costly chemicals (pH adjustment and/or nutrients) that are currently added to the biological system may be reduced or eliminated.

When the microbes assimilate the natural carbohydrate in kenaf, a protective outer shell consisting of glycocalx is produced by the individual bacterial cell. This protective shell is a key factor in providing the biological population with the ability to survive in the toxic environment that is inherent to treatment of these wastes/wastewater streams. Organic and inorganic removal efficiencies in the bioreactor produce solids that are not classified as hazardous wastes. The glycocalyx also functions as a flocculant by causing the smaller suspended solids in the final clarifier to "stick" together and form larger, heavier particles. The larger, heavier solid particles produce a biomass sludge that settles better and faster. Treatment systems that are utilizing coagulants and flocculants to enhance settling may be able to reduce dosage or even eliminate these chemicals completely.

The benefits to the wastewater treatment plant are not limited to the biological system (bioreactors). The solids that are discharged from the biological system dewater better and have a much faster drying time. The enhanced dewatering and drying properties of the solids may eliminate dewatering processes in some treatment plants. More importantly, because the solids now contains kenaf powder, they can be dried and pelletized more economically, and they contain a higher heat energy value. The dried solids can then be shipped to cement kilns or power plants as a biomass fuel.

Cement kilns release huge quantities of $CO_2$, one of the most important Greenhouse Gases (GHG). $CO_2$ emissions from the cement manufacturing industry are released by two different processes. First, limestone must be heated to approximately 2600 degrees F. to produce the cement product. This requires the combustion of a tremendous amount fossil fuel (usually coal). Second, when the limestone is heated, it undergoes a process called calcination and releases large quantities of CO2. Because limestone must be heated and calcined to manufacture cement, the cement industry has very limited options in dealing with GHG ($CO_2$) emissions and the reductions thereof. There is a major initiative underway in the cement industry to find a solution to this problem.

The biomass fuel produced from the dried and pelletized solids can provide cement plants a fuel source with $CO_2$ credits. This biomass fuel, because it is composed of kenaf powder and other biomass, is renewable and sustainable. $CO_2$ credits are created by replacing carbon-rich fossil fuel with biomass fuel that has sequestered carbon from the atmosphere during the kenaf growing season.

Another benefit of using this biomass fuel in cement kilns is the ability of the cement kilns to utilize the inorganic solids (ash) that are part of the combusted biomass fuel. These inorganic solids become part of the cement manufacturing raw materials and actually provide increased production to the cement plants.

Considering the $CO_2$ credits and production increases, this fuel should bring a price comparable to high-quality coal. The kenaf core powder enhances biological activity in activated sludge wastewater treatment, improves settling of biological solids in the final clarifier, and improves the dewatering and drying characteristics of the solids.

Kenaf core powder offers a natural and cost effective alternative to expensive chemical treatment programs. The kenaf core provides a benefit to all aspects of the biological treatment system. Expensive chemical treatment programs for nutrient addition, coagulant and flocculent addition, and dewatering can be significantly reduced or eliminated. Kenaf core powder is a natural and environmentally safe product that is not synthetically manufactured. It is completely biodegradable and does not introduce chemical residues into the environment. The dried and pelletized hemicellulose enhanced solids are much easier to handle and transport. This creates a potential revenue generating product versus a waste that must be shipped to a landfill for disposal.

What is claimed is:

1. A method of treating petroleum-contaminated waste/wastewater comprising the step of:
    introducing kenaf powder into the petroleum waste/wastewater;
    processing the petroleum-contaminated waste/wastewater and kenaf in a bio-reactor; and
    dewatering the petroleum-contaminated waste/wastewater and kenaf mixture to produce a bio-solid material.

2. The method according to claim 1, wherein the kenaf powder is a kenaf core powder.

3. The method according to claim 1, wherein kenaf powder is introduced into the petroleum-contaminated waste/wastewater at a rate range 100 to 5,000 mg/liter.

4. The method according to claim 1, wherein after the dewatering process the bio-solid material is dried to produce a biomass fuel.

5. The method according to claim 1, including a clarifier step prior to directing settled clarifier solids to the bio-solid dewatering step.

6. A method of treating petroleum-contaminated waste/wastewater comprising the step of:
    introducing kenaf powder into the petroleum-contaminated waste/wastewater;
    processing the petroleum-contaminated waste/wastewater and kenaf in a bio-reactor;
    processing the petroleum-contaminated waste/wastewater and kenaf mixture in a clarifier; and
    dewatering the treated petroleum-contaminated waste/wastewater and kenaf mixture to produce a bio-solid material.

7. The method according to claim 6, wherein the kenaf powder is a kenaf core powder.

8. The method according to claim 6, wherein kenaf powder is introduced into the petroleum-contaminated waste/wastewater at a rate range 100 to 5,000 mg/liter.

9. The method according to claim 6, wherein after the dewatering process the bio-solid material is dried to produce a biomass fuel.

10. A method of producing a biomass fuel, comprising the steps of:
    mixing kenaf with petroleum-contaminated waste/wastewater,
    processing the petroleum-contaminated waste/wastewater and kenaf in a bio-reactor; and
    dewatering and drying the biomass solid resulting from the bio-reactor processed petroleum-contaminated waste/wastewater and kenaf.

11. The method according to claim 10, wherein the kenaf powder is a kenaf core powder.

12. The method according to claim 10, wherein kenaf powder is introduced into the petroleum-contaminated waste/wastewater at a rate range 100 to 5,000 mg/liter.

13. The method according to claim 10, wherein after the dewatering process the bio-solid material is dried to produce a biomass fuel.

14. The method according to claim 10, including a clarifier step prior to directing settled clarifier solids to the bio-solid dewatering step.

15. The method according to claim 6, including the step of separating the bio-solid material from the wastewater in the clarifier.

* * * * *